United States Patent
Naruse et al.

(10) Patent No.: US 10,295,727 B2
(45) Date of Patent: May 21, 2019

(54) DISPLAY DEVICE AND METHOD FOR MANUFACTURING DISPLAY PANEL

(71) Applicant: KABUSHIKI KAISHA TOKAI RIKA DENKI SEISAKUSHO, Aichi (JP)

(72) Inventors: Mitsuru Naruse, Aichi (JP); Hiroshi Yoshida, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 16/082,814

(22) PCT Filed: Mar. 30, 2017

(86) PCT No.: PCT/JP2017/013476
§ 371 (c)(1),
(2) Date: Sep. 6, 2018

(87) PCT Pub. No.: WO2017/175667
PCT Pub. Date: Oct. 12, 2017

(65) Prior Publication Data
US 2019/0086603 A1 Mar. 21, 2019

(30) Foreign Application Priority Data
Apr. 7, 2016 (JP) .................................. 2016-077101

(51) Int. Cl.
*G09F 19/12* (2006.01)
*F21V 8/00* (2006.01)
(Continued)

(52) U.S. Cl.
CPC .............. *G02B 6/0056* (2013.01); *F21V 9/14* (2013.01); *F21V 11/16* (2013.01); *G02B 5/223* (2013.01);
(Continued)

(58) Field of Classification Search
CPC .. G02B 6/0038; G02B 6/0056; G02B 6/0061; G02B 27/285; G02B 5/20; G02B 5/22;
(Continued)

(56) References Cited

U.S. PATENT DOCUMENTS 2,165,974 A * 7/1939 Land ....................... G09F 19/18
359/486.02
2013/0127897 A1 5/2013 Baker et al.

FOREIGN PATENT DOCUMENTS

| JP | 61-25002 | 7/1986 |
| JP | 61-25002 Y2 | 7/1986 |

(Continued)

OTHER PUBLICATIONS

International Preliminary Report (PCT/IB/338) issued in corresponding International Application No. PCT/JP2017/013476 dated Oct. 18, 2018.
(Continued)

*Primary Examiner* — Michael P Mooney
(74) *Attorney, Agent, or Firm* — Roberts Mlotkowski Safran Cole & Calderon, P.C.

(57) ABSTRACT

A display device includes a polarizing layer having a polarizing function for reflecting or absorbing light polarized in a stretching direction of a pigment, a first display panel in which the polarizing function is disabled in a first region, a second display panel in which the polarizing function is disabled in a second region, and a light source that emits an illumination light having a polarization direction along the stretching direction or a direction perpendicular to the stretching direction. The first display panel and the second display panel are stacked together to form a display unit. Only the first region is displayed on the display unit by emitting illumination light having a polarization direction along the stretching direction of the first display panel. Only the second region is displayed on the display unit by
(Continued)

emitting illumination light having a polarization direction along the stretching direction of the second display panel.

13 Claims, 6 Drawing Sheets

(51) Int. Cl.
*F21V 9/14* (2006.01)
*G02B 5/22* (2006.01)
*F21V 11/16* (2006.01)
*G02B 27/28* (2006.01)
*G02F 1/1335* (2006.01)

(52) U.S. Cl.
CPC ......... *G02B 6/0061* (2013.01); *G02B 27/285* (2013.01); *G02F 1/13362* (2013.01); *G09F 19/12* (2013.01); *G02B 6/0038* (2013.01)

(58) Field of Classification Search
CPC ....... G02B 5/223; G02B 5/30; G02F 1/13362; F21V 11/16; F21V 9/14; G09F 19/12; G09F 19/18
USPC ........... 385/11, 147, 901; 362/19, 97.1, 227, 362/235, 236, 248; 359/483.01, 485.01, 359/485.03, 485.04, 601; 428/1.1
See application file for complete search history.

(56) References Cited

FOREIGN PATENT DOCUMENTS

| | | |
|---|---|---|
| JP | 2000347604 A | 12/2000 |
| JP | 2013109348 A | 6/2013 |

OTHER PUBLICATIONS

International Search Report and Written Opinion issued in corresponding International Application No. PCT/JP2017/013476 dated Jun. 6, 2017.

* cited by examiner

DISPLAY DEVICE AND METHOD FOR MANUFACTURING DISPLAY PANEL

CROSS-REFERENCE TO RELATED APPLICATIONS

The present application is a U.S. National Phase of PCT/JP2017/013476 filed on Mar. 30, 2017 claiming priority to Japanese Patent Application No. 2016-077101 filed on Apr. 7, 2016. The disclosure of the PCT Application is hereby incorporated by reference into the present Application.

TECHNICAL FIELD

The present invention relates to a display device and a method for manufacturing a display panel.

BACKGROUND ART

A display device switchably displaying different shapes, etc., on the same display surface is known (see, e.g., Japanese Examined Utility Model Application Publication No. 61/25002). This display device is composed of two light sources, two light source-polarizing panels respectively provided in front of the light sources and having polarization directions perpendicular to each other, and two display-polarizing panels which are overlapped and provided in front of the light source-polarizing panels and have polarization directions perpendicular to each other and each of which has a light transmitting portion formed by cutting out a shape or a letter/character to be displayed. The device is configured as a display switching lamp which switches the display by switching a turned-on light source between the two light sources.

Since the display device disclosed in Japanese Examined Utility Model Application Publication No. 61/25002 switchably displays different shapes, etc., on the same display surface, the display surface requires only a small space and clear display is obtained with a simpler configuration than the conventional display switching lamp used for the same purpose.

CITATION LIST

Patent Literature

Japanese Examined Utility Model Application Publication No. 61/25002

SUMMARY OF INVENTION

Technical Problem

In case of the display device of Japanese Examined Utility Model Application Publication No. 61/25002, the light transmitting portion needs to be formed on the display-polarizing panel by cutting out a shape or a letter/character to be displayed. Therefore, there is a problem that transmittance is different between the cut-out portion and the non-cut out portion, which affects the contrast of the displayed shape or letter/character and causes a decrease in display performance. There is also a problem in terms of cost reduction since the step of cutting the display-polarizing panels is required.

It is an object of the invention to provide a display device with high display performance at low cost.

Solution to Problem

[1] A display device in an embodiment of the invention comprises: a polarizing layer in which a pigment etc. is absorbed on polymer chains so as to have a polarizing function for reflecting or absorbing light polarized in a stretching direction of the pigment etc.; a first display panel in which the polarizing function of the polarizing layer is disabled in a first region; a second display panel in which the polarizing function of the polarizing layer is disabled in a second region; and a light source that emits an illumination light having a polarization direction along the stretching direction or along a direction perpendicular to the stretching direction, wherein the first display panel and the second display panel are stacked together to form a display unit, wherein only the first region is displayed on the display unit by emitting illumination light having a polarization direction along the stretching direction of the first display panel, and wherein only the second region is displayed on the display unit by emitting illumination light having a polarization direction along the stretching direction of the second display panel.

[2] The display device defined by [1] may be such that the first region of the first display panel and the second region of the second display panel, after being combined into the display unit, partially overlap in a thickness direction of the display unit.

[3] The display device defined by [1] or [2] may be such that the first display panel or the second display panel comprises a protective layer on or under the polarizing layer.

[4] A method for manufacturing a display panel in another embodiment of the invention comprises: a polarizing layer-preparing step for preparing a polarizing layer having a polarizing function for reflecting or absorbing light polarized in a stretching direction of a pigment etc. of a display panel in which the pigment etc. is absorbed on polymer chains; and a laser irradiation step for irradiating a predetermined region of the polarizing layer with a laser light, wherein the laser light comprises linearly polarized light or elliptically polarized light, and wherein a processing is performed by using the laser light with a polarization direction inclined at a predetermined angle relative to the stretching direction of the polarizing layer.

[5] The method for manufacturing a display panel defined by [4] may be such that in the laser irradiation step, a predetermined region of the display panel is irradiated with the laser light so that the polarizing function in the predetermined region is disabled.

[6] The display device defined by any one of [1] to [3] may be such that the stretching direction of the first display panel and the stretching direction of the second display panel are orthogonal to each other.

[7] The display device defined by any one of [1] to [3] and [6] may be such that the light source comprises a first light source with a polarization direction along the stretching direction of the first display panel and a second light source with a polarization direction along the stretching direction of the second display panel, and wherein the polarization direction of the first light source and the polarization direction of the second light source are orthogonal to each other.

Advantageous Effects of Invention

According to an embodiment of the invention, it is possible to provide a display device with high display performance at low cost.

DESCRIPTION OF EMBODIMENT (Configuration of a Display Device 1 in an Embodiment of the Invention)

Figure 1A:
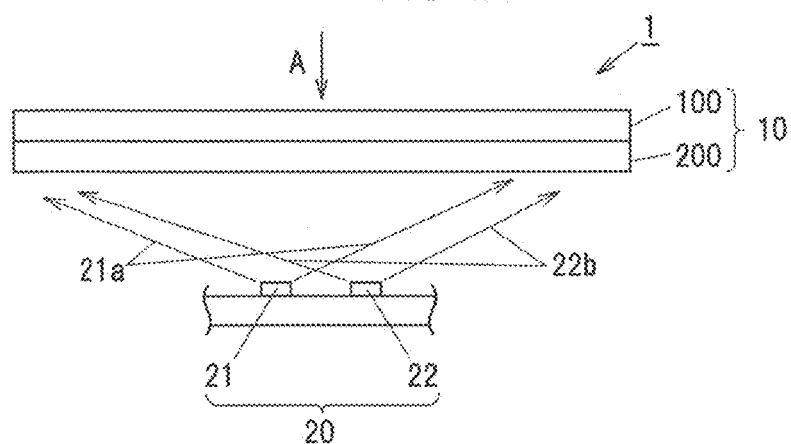
FIG. 1A is an explanatory diagram illustrating a configuration of a display device in an embodiment of the present invention.
Figure 1B:
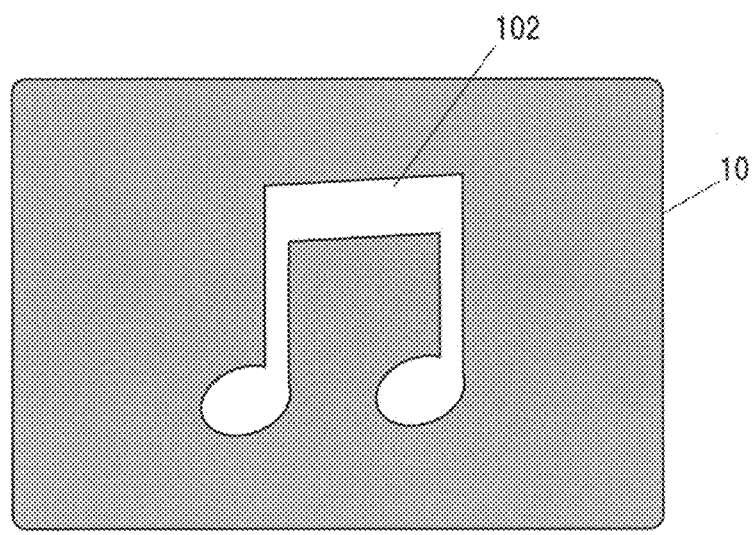
FIG. 1B is an explanatory diagram illustrating a state in which a musical note symbol is displayed on a display unit when viewing the display device in an A direction.
Figure 1C:
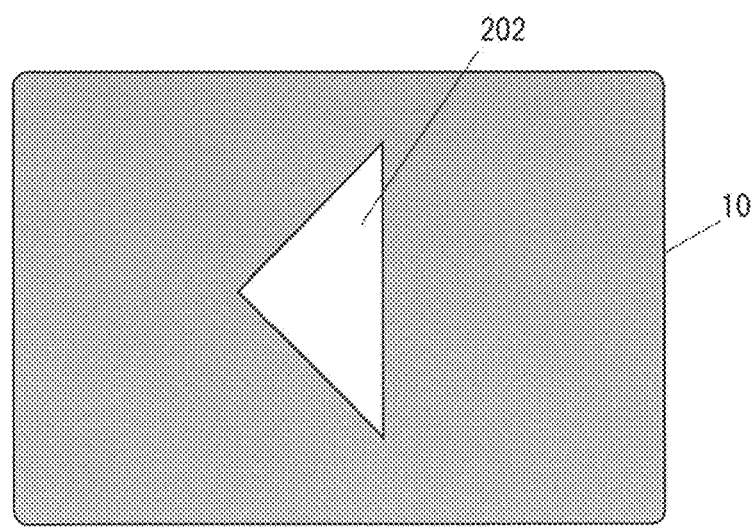
FIG. 1C is an explanatory diagram illustrating a state in which an arrow symbol is displayed on the display unit when viewing the display device in the A direction.
Figure 2A:
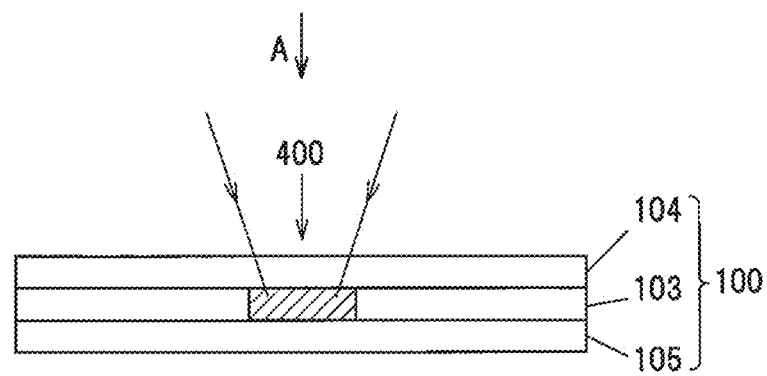
FIG. 2A is a cross sectional view showing a first display panel.
Figure 2B:
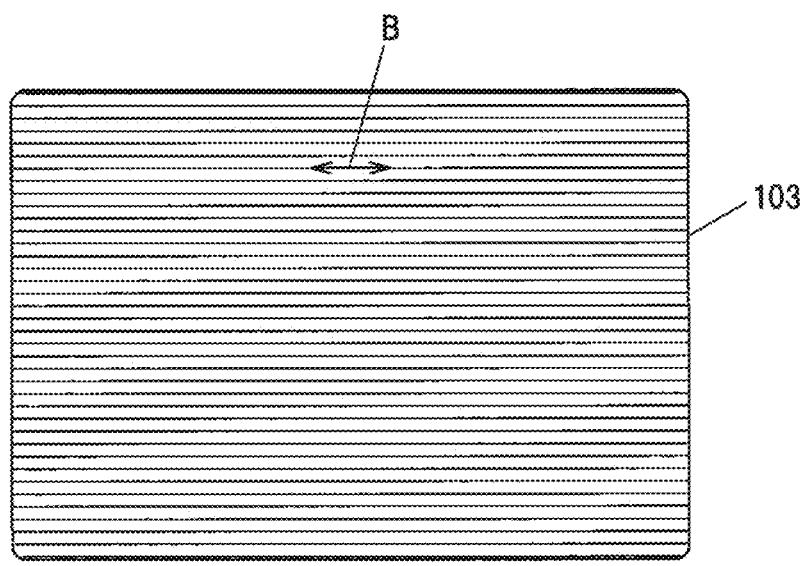
FIG. 2B is a plan view showing a PVA layer of the first display panel when viewed in the A direction.
Figure 3A:
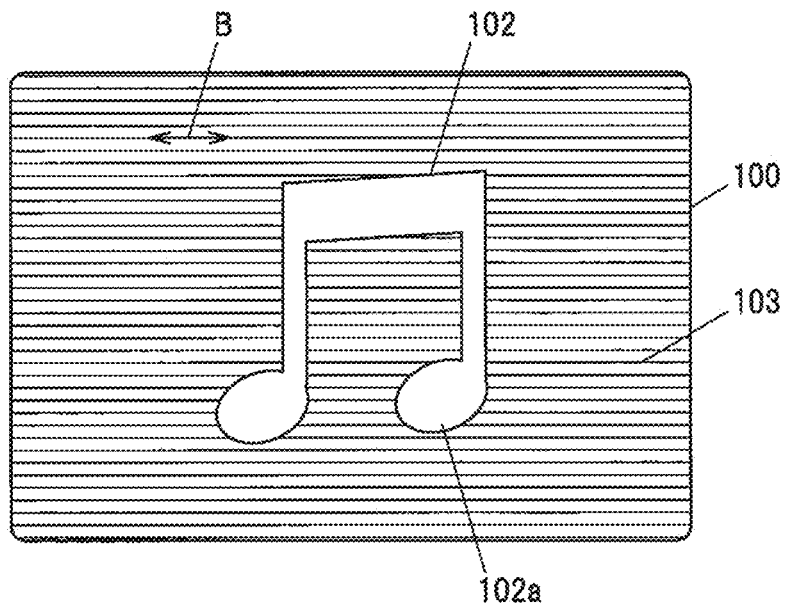
FIG. 3A is a plan view showing the first display panel.
Figure 3B:
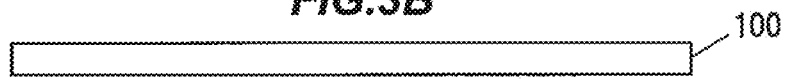
FIG. 3B is a side view showing the first display panel.
Figure 4A:
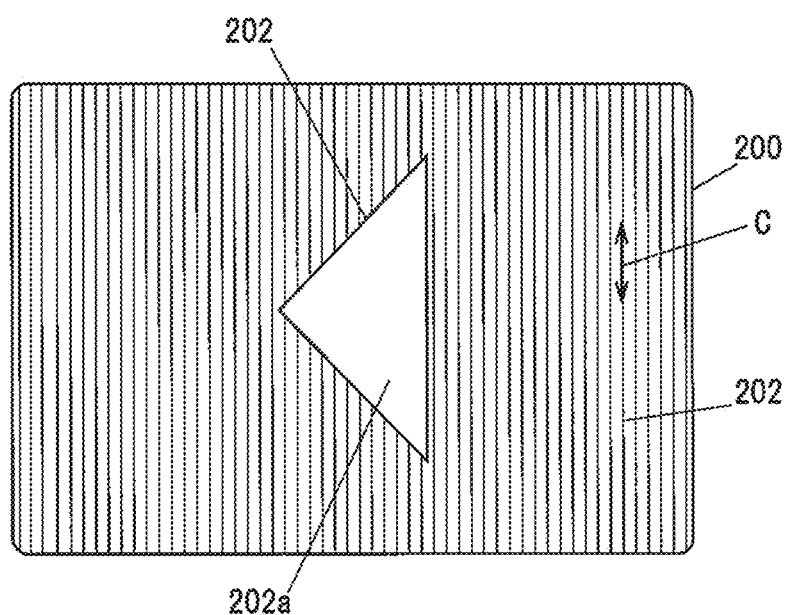
FIG. 4A is a plan view showing a second display panel.
Figure 4B:
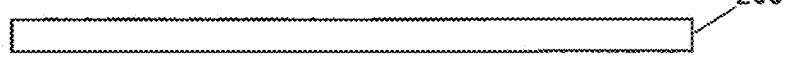
FIG. 4B is a side view showing the second display panel.
Figure 5A:
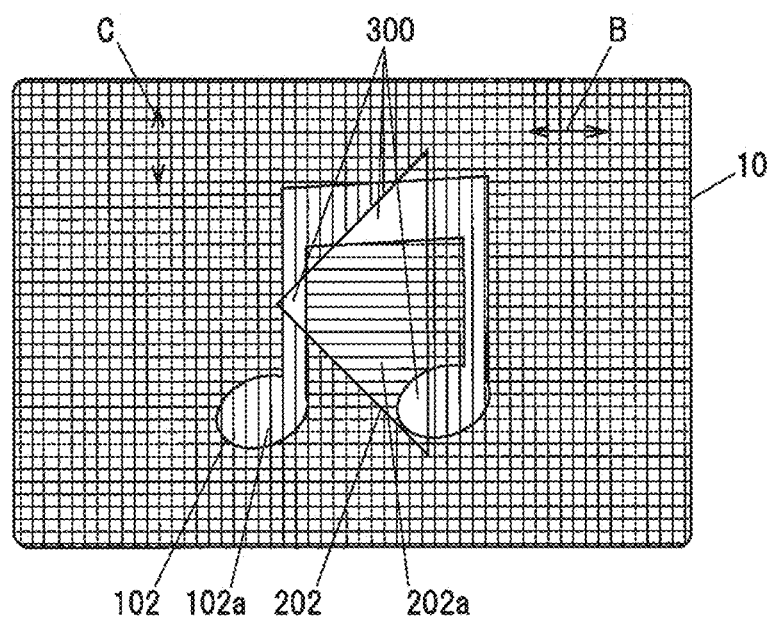
FIG. 5A is a plan view showing the display unit.
Figure 5B:
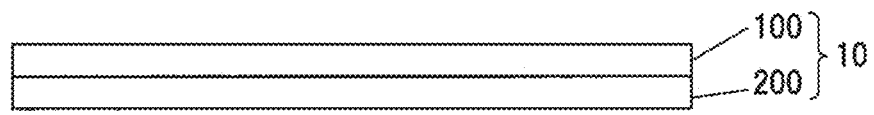
FIG. 5B is a side view showing the display unit.

FIG. 1A is an explanatory diagram illustrating a configuration of a display device in an embodiment of the invention, FIG. 1B is an explanatory diagram illustrating a state in which a musical note symbol is displayed on a display unit when viewing the display device in an A direction, and FIG. 1C is an explanatory diagram illustrating a state in which an arrow symbol is displayed on the display unit when viewing the display device in the A direction. FIG. 2A is a cross sectional view showing a first display panel and FIG. 2B is a plan view showing a PVA layer of the first display panel when viewed in the A direction. FIG. 3A is a plan view showing the first display panel and FIG. 3B is a side view showing the first display panel. FIG. 4A is a plan view showing a second display panel and FIG. 4B is a side view showing the second display panel. Then, FIG. 5A is a plan view showing the display unit and FIG. 5B is a side view showing the display unit. The configuration of a display device 1 in an embodiment of the invention will be described below based on these drawings.

As shown in FIGS. 1A to 1C, the display device 1 in the embodiment of the invention has a polarizing layer in which a pigment, etc., is absorbed on polymer chains so as to have a polarizing function for reflecting or absorbing light polarized in a stretching direction of the pigment, etc. (the arrow B direction), a first display panel 100 in which the polarizing function of the polarizing layer is disabled in a note-mark section 102 constituting a first region, a second display panel 200 in which the polarizing function of the polarizing layer is disabled in an arrow-mark section 202 constituting a second region, and light sources 20 (a first light source 21 and a second light source 22) which emit illumination light having a polarization direction along the stretching direction (the arrow B direction) or along a direction perpendicular to the stretching direction (an arrow C direction), wherein the first display panel 100 and the second display panel 200 are stacked together to form a display unit 10, only the note-mark section 102 constituting the first region is displayed on the display unit 10 by emitting illumination light having a polarization direction along the stretching direction of the first display panel 100 (the arrow B direction), and only the arrow-mark section 202 constituting the second region is displayed on the display unit 10 by emitting light having a polarization direction along the stretching direction of the second display panel 200 (the arrow C direction).

The light sources 20 (the first light source 21 and the second light source 22) can use, e.g., laser light or LED light etc. When light emitted from the light sources 20 (the first light source 21 and the second light source 22) is, e.g., laser light, a polarization direction is adjusted so that light has a polarized component in a specific direction. In case of LED light, etc., a polarizing element is arranged at a light output portion so that light has a polarized component in a specific direction. As shown in FIG. 1A, the light sources 20 consist of the first light source 21 with a polarization direction along the stretching direction of the first display panel 100 (the arrow B direction) and the second light source 22 with a polarization direction along the stretching direction of the second display panel 200 (the arrow c direction). First illumination light 21a is emitted from the first light source 21 toward the display unit 10, and second illumination light 22a is emitted from the second light source 22 toward the display unit 10.

When the light source 20 is a source of elliptically polarized light or circularly polarized light, the illumination configuration may be such that, e.g., a polarizing element relatively rotatable about a light axis is arranged at the light output portion of the light source 20, and the light source 20 and the polarizing element are rotated so that the first illumination light 21a with a polarization direction along the stretching direction of the first display panel 100 (the arrow B direction) and the second illumination light 22a with a polarization direction along the stretching direction of the second display panel 200 (the arrow C direction) are produced and illumination light is emitted toward the display unit 10.

(First Display Panel 100)

As shown in FIG. 2A, the first display panel 100 is composed of a PVA layer 103 as a polarizing layer having a polarizing function, and a first protective film 104 and a second protective film 105 which respectively protect above and below the PVA layer 103.

To form the PVA layer 103, e.g., a thick film of PVA (polyvinyl alcohol) which has absorbed iodine pigments is crosslinked with boric acid. The PVA thick film, after being dried and becoming stable, is stretched so that the iodine pigments are oriented in a certain direction, thereby developing polarizing properties.

FIG. 3A is a plan view showing the first display panel and FIG. 3B is a side view showing the first display panel. As shown in FIG. 3A, the oriented direction of the iodine pigments is the stretching direction (the arrow B direction). Light having a polarized component parallel to the stretching direction (the arrow B direction) is reflected or absorbed and thus does not pass through the PVA layer 103. On the other hand, light having a polarized component perpendicular to the stretching direction (the arrow B direction) passes through the PVA layer 103. Therefore, the PVA layer 103 stretched in the arrow B direction as shown in FIG. 3A has a polarizing function. The stretching direction (the arrow B direction) is also called "an absorption axis".

For example, a TAC (cellulose triacetate) film, which is a protective film having excellent optical properties, is used to form the first protective film (first TAC layer) 104 and the second protective film (second TAC layer) 105 as the protective layers. Although the protective layer is configured to be provided on or under the polarizing layer, the protective layer may not be provided.

The first display panel 100 is configured to display, e.g., the note-mark section 102 as shown in FIG. 3A. A first region 102a of the note-mark section 102 is a region in which the polarizing function of the PVA layer 103 is disabled. The PVA layer 103 other than the first region 102a is the region having the polarizing function.

(Second Display Panel 200)

The second display panel 200 is composed of a PVA layer as a polarizing layer having a polarizing function, and a first protective film and a second protective film which respectively protect above and below the PVA layer, in the same manner as the first display panel 100.

To form the PVA layer, e.g., a thick film of PVA (polyvinyl alcohol) which has absorbed iodine pigments is crosslinked with boric acid. The PVA thick film, after being dried and becoming stable, is stretched so that the iodine pigments are oriented in a certain direction, thereby developing polarizing properties.

FIG. 4A is a plan view showing the second display panel and FIG. 4B is a side view showing the second display panel. As shown in FIG. 4A, the oriented direction of the iodine pigments is the stretching direction (the arrow C direction). Light having a polarized component parallel to the stretching direction (the arrow C direction) is reflected or absorbed and thus does not pass through the PVA layer. On the other hand, light having a polarized component perpendicular to the stretching direction (the arrow C direction) passes through the PVA layer. Therefore, the PVA layer stretched in the arrow C direction as shown in FIG. 4A has a polarizing function. The stretching direction (the arrow C direction) is also called "an absorption axis".

For example, a TAC (cellulose triacetate) film, which is a protective film having excellent optical properties, is used to form the first protective film (first TAC layer) and the second protective film (second TAC layer), in the same manner as the first display panel 100.

The second display panel 200 is configured to display, e.g., the arrow-mark section 202 as shown in FIG. 4A. A second region 202a of the arrow-mark section 202 is a region in which the polarizing function of the PVA layer is disabled. The PVA layer other than the second region 202a is the region having the polarizing function.

The first display panel 100 and the second display panel 200 are stacked and form the display unit 10, as shown in FIG. 1A. When arranged in such a manner, the stretching direction of the first display panel 100 (the arrow B direction) is orthogonal to the stretching direction of the second display panel 200 (the arrow C direction), as understood from FIGS. 3A and 4A.

In addition, when formed into the display unit 10, the note-mark section 102 of the first display panel 100 and the arrow-mark section 202 of the second display panel 200 are arranged so that the first region 102a partially overlaps the second region 202a.

FIG. 5A is a plan view showing the display unit and FIG. 5B is a side view showing the display unit. FIG. 5A shows the note-mark section 102 of the first display panel 100 overlapping the arrow-mark section 202 of the second display panel 200.

The stretching direction of the first display panel 100 (the arrow B direction) is orthogonal to the stretching direction of the second display panel 200 (the arrow C direction). Then, the first region 102a partially overlaps the second region 202a in some regions. These regions are defined as overlap regions 300.

In the configuration shown in FIG. 5A, illumination light passes through the first region 102a of the note-mark section 102 except the overlap regions 300 since the polarizing function of the first display panel 100 is disabled in the first region 102a. Only a component of the illumination light polarized in the stretching direction of the first display panel 100 (the arrow B direction) passes through the second display panel 200. Then, the illumination light passes through the overlap regions 300 since the polarizing function is disabled. The component polarized in the stretching direction of the first display panel 100 (the arrow B direction) does not pass through the region excluding the first region 102a and the overlap regions 300, i.e., does not pass through the region other than the note-mark section 102. Thus, when the first illumination light 21a (linearly polarized light in the arrow B direction) having only a component polarized in the stretching direction of the first display panel 100 (the arrow B direction) is emitted onto the display unit 10, only the note-mark section 102 which is the first region 102a can be displayed.

Also, in the configuration shown in FIG. 5A, illumination light passes through the second region 202a of the arrow-mark section 202 except the overlap regions 300 since the polarizing function of the second display panel 200 is disabled in the second region 202a. Only a component of the illumination light polarized in the stretching direction of the second display panel 200 (the arrow C direction) passes through the first display panel 100. Then, illumination light passes through the overlap region 300 since the polarizing function is disabled. The component polarized in the stretching direction of the second display panel 200 (the arrow C direction) does not pass through the region excluding the second region 202a and the overlap regions 300, i.e., does not pass through the region other than the arrow-mark section 202. Thus, when the second illumination light 22a (linearly polarized light in the arrow C direction) having only a component polarized in the stretching direction of the second display panel 200 (the arrow C direction) is emitted onto the display unit 10, only the arrow-mark section 202 which is the second region 202a can be displayed.

(Display Operation of the Display Device 1)
(Where the Note-Mark Section 102 is Displayed on the Display Unit 10)

In the display device 1 shown in FIG. 1A, the first light source 21 is turned on and the second light source 22 is turned off. The display unit 10 is illuminated with only the illumination light 21a having a component polarized in the stretching direction of the first display panel 100 (polarized in the arrow B direction). As described above, the illumination light 21a passes through the first region 102a of the note-mark section 102 except the overlap regions 300 since the polarizing function of the first display panel 100 is disabled in the first region 102a. Only a component of the illumination light polarized in the stretching direction of the first display panel 100 (the arrow B direction) passes through the second display panel 200. Then, the illumination light passes through the overlap regions 300 since the polarizing function is disabled. The component polarized in the stretching direction of the first display panel 100 (the arrow B direction) does not pass through the region excluding the first region 102a and the overlap regions 300, i.e., does not pass through the region other than the note-mark section 102. Thus, only the note-mark section 102 is displayed on the display unit 10 and the other portion is not displayed, as shown in FIG. 1B.

(Where the Arrow-Mark Section 202 is Displayed on the Display Unit 10)

In the display device 1 shown in FIG. 1A, the second light source 22 is turned on and the first light source 21 is turned off. The display unit 10 is illuminated with only the second illumination light 22a having a component polarized in the stretching direction of the second display panel 200 (polarized in the arrow C direction). As described above, the second illumination light 22a passes through the second region 202a of the arrow-mark section 202 except the overlap regions 300 since the polarizing function of the second display panel 200 is disabled in the second region 202a. Only a component of the illumination light polarized in the stretching direction of the second display panel 200 (the arrow C direction) passes through the first display panel 100. Then, illumination light passes through the overlap region 300 since the polarizing function is disabled. The component polarized in the stretching direction of the second display panel 200 (the arrow C direction) does not pass through the region excluding the second region 202a and the overlap regions 300, i.e., does not pass through the region other than the arrow-mark section 202. Thus, only the arrow-mark section 202 is displayed on the display unit 10 and the other portion is not displayed, as shown in FIG. 1C.

(Method for Manufacturing the Display Panel)

Figure 6A:
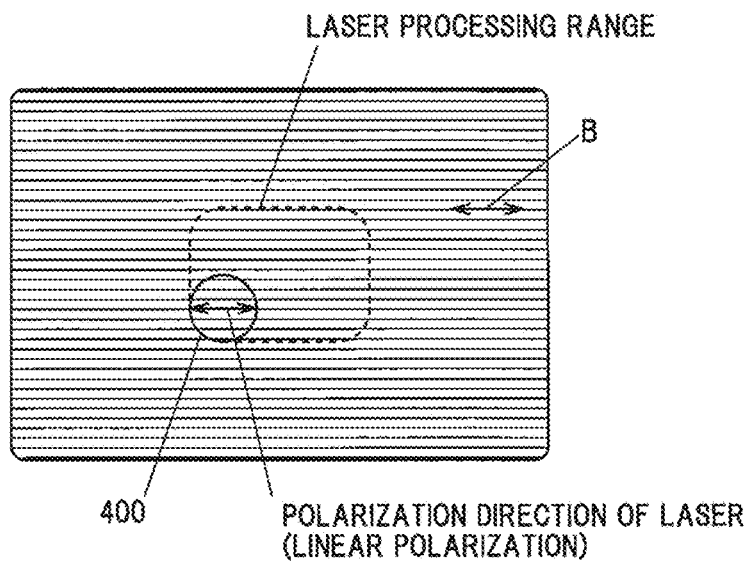
FIG. 6A is a plan view showing a laser processing method using laser light of which polarization direction is parallel to a stretching direction (an arrow B direction).
Figure 6B:
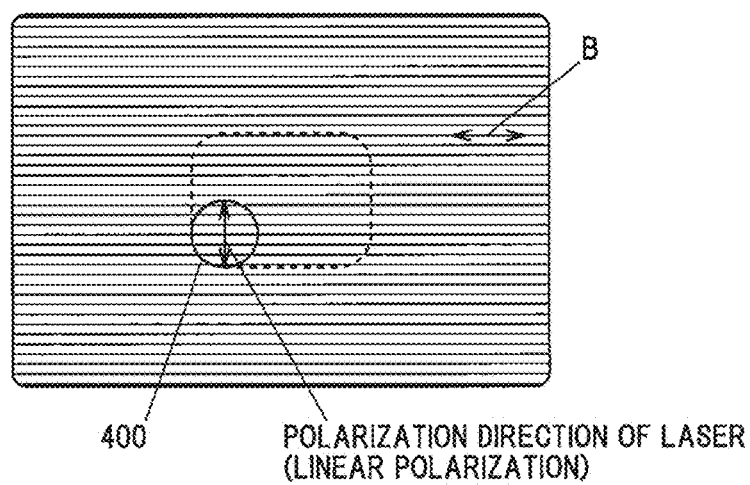
FIG. 6B is a plan view showing a laser processing method using laser light of which polarization direction is perpendicular to the stretching direction (the arrow B direction).
Figure 6C:
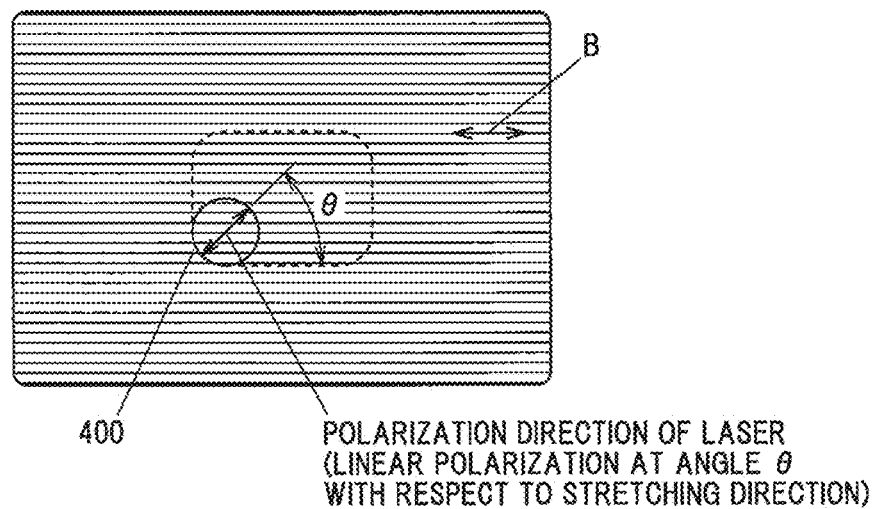
FIG. 6C is a plan view showing a laser processing method using laser light of which polarization direction is inclined at a predetermined angle θ with respect to the stretching direction (the arrow B direction).
Figure 7A:
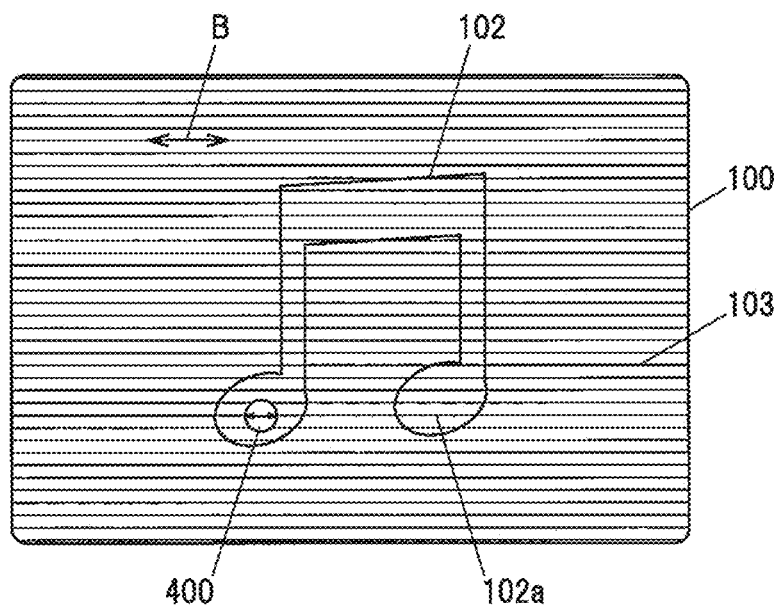
FIG. 7A is a plan view showing a relation between the stretching direction of the first display panel and the polarization direction of the laser light during a laser irradiation step.
Figure 7B:
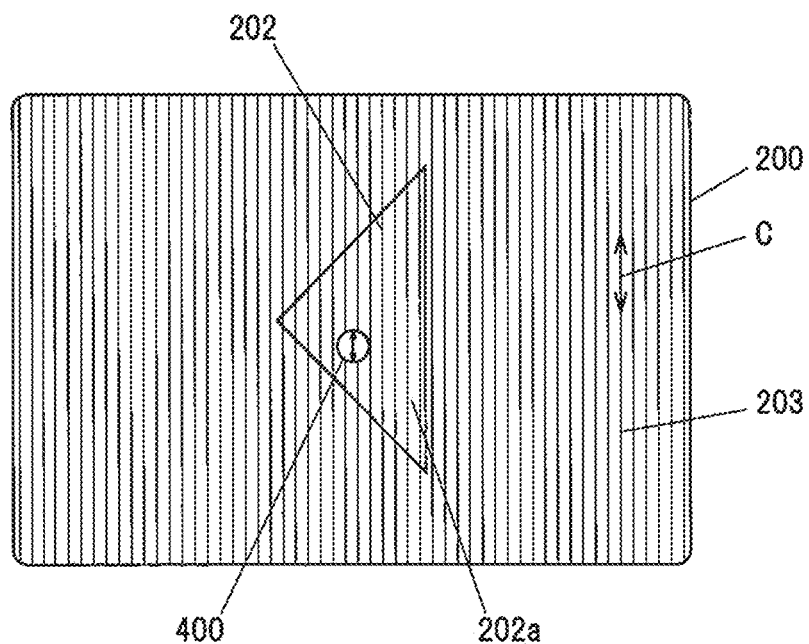
FIG. 7B is a plan view showing a relation between the stretching direction of the second display panel and the polarization direction of the laser light during the laser irradiation step.

FIGS. 6A to 6C are plan views showing a method for manufacturing a display panel, wherein FIG. 6A is a plan view showing a laser processing method using laser light of which polarization direction is parallel to the stretching direction (an arrow B direction), FIG. 6B is a plan view showing a laser processing method using laser light of which polarization direction is perpendicular to the stretching direction (the arrow B direction), and FIG. 6C is a plan view showing a laser processing method using laser light of which polarization direction is inclined at a predetermined angle θ with respect to the stretching direction (the arrow B direction). FIG. 7A is a plan view showing a relation between the stretching direction of the first display panel and the polarization direction of the laser light during a laser irradiation step and FIG. 7B is a plan view showing a relation between the stretching direction of the second display panel and the polarization direction of the laser light during the laser irradiation step.

By referring to FIGS. 6A to 6C, the method for manufacturing a display panel will be described by taking the first display panel 100 as an example.

(Polarizing Layer-Preparing Step)

The polarizing layer-preparing step is a step for preparing a polarizing layer having a polarizing function for reflecting or absorbing light polarized in a stretching direction of a pigment, etc., of a display panel in which the pigment, etc., is absorbed on polymer chains. In the present embodiment, the polarizing layer is the PVA layer 103 protected from above and below by the first protective film 104 and the second protective film 105, and the first display panel 100 are provided with these layer and films. The polarizing layer may be prepared by the polarizing layer-preparing step, or may be purchased, etc.

(Laser Irradiation Step)

The laser irradiation step is a step for irradiating a predetermined region of the polarizing layer with laser light. Laser light 400 is linearly polarized light or elliptically polarized light. As shown in FIG. 2A, a predetermined region of the PVA layer 103 as the polarizing layer, e.g., the first region 102a of the note-mark section 102 is irradiated with the laser light 400. By the irradiation with the laser light 400, iodine pigments or dyes in the irradiated region are removed due to sublimation, etc. It is thereby possible to disable the polarizing function of the irradiated region. As an alternative to the method shown in FIG. 2A, the protective layers (the first TAC layer and the second TAC layer) may be attached after irradiating a predetermined region of the PVA layer 103 to the laser light 400.

When the laser processing range is processed by the laser light 400 with a polarization direction parallel to the stretching direction (the arrow B direction) as shown in FIG. 6A, the laser light 400 is absorbed by the PVA layer 103 and reactivity in the laser irradiation step is good.

On the other hand, when the laser processing range is processed by the laser light 400 with a polarization direction perpendicular to the stretching direction (the arrow B direction) as shown in FIG. 6B, the laser light 400 passes through the PVA layer 103 and reactivity in the laser irradiation step is poor.

Meanwhile, when the laser processing range is processed by the laser light 400 with a polarization direction inclined at a predetermined angle θ with respect to the stretching direction (the arrow B direction) as shown in FIG. 6C, the amount of the laser light 400 absorbed by the PVA layer 103 depends on the angle θ and it is possible to control the absorbed amount of the laser light 400 in the laser irradiation step.

A laser processing machine used in the laser irradiation step can be selected according to the peak wavelength of the pigment. In detail, a YAG wavelength laser or a laser with a wavelength in the visible range is used for the laser processing. The laser processing is preferably performed with not less than an amount of heat causing sublimation of the pigments and not more than an amount of heat causing reaction of the protective film.

(Laser Processing of the First Display Panel 100)

FIG. 7A is a plan view showing a relation between the stretching direction of the first display panel and the polarization direction of the laser light during the laser irradiation step. A polarization direction of the laser light 400 is adjusted to be parallel to the stretching direction of the first display panel 100 (the arrow B direction). In other words, a predetermined angle θ shown in FIG. 6C is set to zero. In this state, the laser light 400 is two-dimensionally moved in the first region 102a of the note-mark section 102 so that the pigments in the note-mark section 102 is removed by sublimation, etc., thereby disabling the polarizing function.

As a result, it is possible to realize good reactivity in the laser irradiation step for the first display panel 100.

(Laser Processing of the Second Display Panel 200)

FIG. 7B is a plan view showing a relation between the stretching direction of the second display panel and the polarization direction of the laser light during the laser irradiation step. A polarization direction of the laser light 400 is adjusted to be parallel to the stretching direction of the second display panel 200 (the arrow C direction). In other words, a predetermined angle θ shown in FIG. 6C is set to zero. In this state, the laser light 400 is two-dimensionally moved in the second region 202a of the arrow-mark section 202 so that the pigments in the arrow-mark section 202 is removed by sublimation, etc., thereby disabling the polarizing function. As a result, it is possible to realize good reactivity in the laser irradiation step for the second display panel 200.

Effects of the Embodiment of the Invention

The display device and the manufacturing method in the present embodiment exert the following effects.

(1) The display device in the present embodiment has a polarizing layer in which a pigment, etc., is absorbed on polymer chains so as to have a polarizing function for reflecting or absorbing light polarized in a stretching direction of the pigment, etc., a first display panel 100 (the arrow B direction) in which the polarizing function of the polarizing layer is disabled in a note-mark section 102 constituting a first region, a second display panel 200 in which the polarizing function of the polarizing layer is disabled in an arrow-mark section 202 constituting a second region, and light sources 20 (a first light source 21 and a second light source 22) which emit illumination light having a polarization direction along the stretching direction (the arrow B direction) or along a direction perpendicular to the stretching direction (an arrow C direction), wherein the first display panel 100 and the second display panel 200 are stacked together to form a display unit 10, only the note-mark section 102 constituting the first region is displayed on the display unit 10 by emitting illumination light having a polarization direction along the stretching direction of the first display panel 100 (the arrow B direction), and only the arrow-mark section 202 constituting the second region is displayed on the display unit 10 by emitting light having a polarization direction along the stretching direction of the second display panel 200 (the arrow C direction). In this configuration, it is possible to switch display by emitting illumination light in a different polarization state from the first light source 21 or the second light source 22 onto the display unit 10. Display can be switched in the same color, e.g., switched from white to white.

(2) In the method for manufacturing a display panel in the present embodiment, the laser light 400 is linearly polarized light or elliptically polarized light, and the processing is performed by the laser light 400 having a polarization direction inclined at a predetermined angle with respect to the stretching direction of the polarizing layer. As a result, it is possible to control the absorbed amount of the laser light in the laser irradiation step. In addition, by setting the predetermined angle θ shown in FIG. 6C to coincide with the stretching direction of the pigment, etc., it is possible to realize good reactivity in the laser irradiation step for the display panel.

Although some embodiments of the invention have been described above, the embodiments are merely an example and the invention according to claims is not to be limited thereto. These new embodiments may be implemented in various other forms, and various omissions, substitutions and changes, etc., can be made without departing from the gist of the invention. In addition, all combinations of the features described in the embodiments are not necessary to solve the problem of the invention. Further, these embodiments are included within the scope and gist of the invention and also within the invention described in the claims and the equivalency thereof.

REFERENCE SIGNS LIST

1 DISPLAY DEVICE
10 DISPLAY UNIT
20 LIGHT SOURCE
21 FIRST LIGHT SOURCE
22 SECOND LIGHT SOURCE
100 FIRST DISPLAY PANEL
102a FIRST REGION
200 SECOND DISPLAY PANEL
202a SECOND REGION
300 OVERLAP REGION
400 LASER LIGHT

The invention claimed is:

1. A display device, comprising:
   a polarizing layer in which a pigment is absorbed on polymer chains so as to have a polarizing function for reflecting or absorbing light polarized in a stretching direction of the pigment;
   a first display panel in which the polarizing function of the polarizing layer is disabled in a first region;
   a second display panel in which the polarizing function of the polarizing layer is disabled in a second region; and
   a light source that emits an illumination light having a polarization direction along the stretching direction or along a direction perpendicular to the stretching direction,
   wherein the first display panel and the second display panel are stacked together to form a display unit,
   wherein only the first region is displayed on the display unit by emitting illumination light having a polarization direction along the stretching direction of the first display panel, and
   wherein only the second region is displayed on the display unit by emitting illumination light having a polarization direction along the stretching direction of the second display panel.

2. The display device according to claim 1, wherein the first region of the first display panel and the second region of the second display panel, after being combined into the display unit, partially overlap in a thickness direction of the display unit.

3. The display device according to claim 1, wherein the first display panel or the second display panel comprises a protective layer on or under the polarizing layer.

4. A method for manufacturing a display panel, comprising:
   a polarizing layer-preparing step for preparing a polarizing layer having a polarizing function for reflecting or absorbing light polarized in a stretching direction of a pigment, of a display panel in which the pigment, is absorbed on polymer chains; and
   a laser irradiation step for irradiating a predetermined region of the polarizing layer with a laser light emitted from a light source, wherein the laser light comprises linearly polarized light or elliptically polarized light, and wherein a processing is performed by using the laser light with a polarization direction inclined at a predetermined angle relative to the stretching direction of the polarizing layer.

5. The method for manufacturing a display panel according to claim 4, wherein in the laser irradiation step, a predetermined region of the display panel is irradiated with the laser light so that the polarizing function in the predetermined region is disabled.

6. The display device according to claim 1, wherein the stretching direction of the first display panel and the stretching direction of the second display panel are orthogonal to each other.

7. The display device according to claim 1, wherein the light source comprises a first light source with a polarization direction along the stretching direction of the first display panel and a second light source with a polarization direction along the stretching direction of the second display panel, and wherein the polarization direction of the first light source and the polarization direction of the second light source are orthogonal to each other.

8. The display device according to claim 2, wherein the first display panel or the second display panel comprises a protective layer on or under the polarizing layer.

9. The display device according to claim 2, wherein the stretching direction of the first display panel and the stretching direction of the second display panel are orthogonal to each other.

10. The display device according to claim 3, wherein the stretching direction of the first display panel and the stretching direction of the second display panel are orthogonal to each other.

11. The display device according to claim 2, wherein the light source comprises a first light source with a polarization direction along the stretching direction of the first display panel and a second light source with a polarization direction along the stretching direction of the second display panel, and the polarization direction of the first light source and the polarization direction of the second light source are orthogonal to each other.

12. The display device according to claim 3, wherein the light source comprises a first light source with a polarization direction along the stretching direction of the first display panel and a second light source with a polarization direction along the stretching direction of the second display panel, and the polarization direction of the first light source and the polarization direction of the second light source are orthogonal to each other.

13. The display device according to claim 6, wherein the light source comprises a first light source with a polarization direction along the stretching direction of the first display panel and a second light source with a polarization direction along the stretching direction of the second display panel, and the polarization direction of the first light source and the polarization direction of the second light source are orthogonal to each other.

* * * * *